(12) United States Patent
Savatsky et al.

(10) Patent No.: US 10,995,161 B2
(45) Date of Patent: May 4, 2021

(54) METHOD OF MAINTAINING A MELT FLOW INDEX OF A POLYETHYLENE POLYMER PRODUCT

(71) Applicant: Univation Technologies, LLC, Houston, TX (US)

(72) Inventors: Bruce J. Savatsky, Kingwood, TX (US); R. Eric Pequeno, Baytown, TX (US); Brandon C. Locklear, Houston, TX (US); Jim Farley, League City, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 16/620,102

(22) PCT Filed: Jun. 6, 2018

(86) PCT No.: PCT/US2018/036202
§ 371 (c)(1),
(2) Date: Dec. 6, 2019

(87) PCT Pub. No.: WO2018/226787
PCT Pub. Date: Dec. 13, 2018

(65) Prior Publication Data
US 2020/0140581 A1    May 7, 2020

Related U.S. Application Data

(60) Provisional application No. 62/516,813, filed on Jun. 8, 2017.

(51) Int. Cl.
*C08F 10/02* (2006.01)
*C08F 2/24* (2006.01)
*C08F 4/6592* (2006.01)

(52) U.S. Cl.
CPC ........... *C08F 10/02* (2013.01); *C08F 2/24* (2013.01); *C08F 4/6592* (2013.01)

(58) Field of Classification Search
CPC .. C08F 2/24; C08F 4/6592; C08F 2/34; C08F 10/02

(Continued)

(56) References Cited

U.S. PATENT DOCUMENTS

2005/0228138 A1* 10/2005 Davis .................. C08F 10/02
525/191

OTHER PUBLICATIONS

International Preliminary Report on Patentability for related PCT Application No. PCT/US2018/036202, dated Dec. 19, 2019 (7 pgs).

(Continued)

*Primary Examiner* — William K Cheung
(74) *Attorney, Agent, or Firm* — Brooks, Cameron & Huebsch, PLLC

(57) ABSTRACT

The present disclosure provides a method of maintaining a target value of a melt flow index of a polyethylene polymer product being synthesized with a metallocene catalyst in a fluidized bed gas phase reactor. The method includes producing the polyethylene polymer product at the target value of the melt flow index with a metallocene catalyst in a fluidized bed gas phase reactor at a steady state in which the fluidized bed gas phase reactor is at a first reactor temperature and receives feeds of hydrogen and ethylene at a hydrogen to ethylene feed ratio at a first ratio value. When a change in reactor temperature is detected, the hydrogen to ethylene feed ratio is changed from the first ratio value to a second ratio value so as to maintain the melt flow index value of the polyethylene polymer product at the target value.

5 Claims, 1 Drawing Sheet

(58) Field of Classification Search
USPC .......................................................... 526/59
See application file for complete search history.

(56) References Cited

OTHER PUBLICATIONS

International Search Report & Written Opinion for related PCT Application No. PCT/US2018/036202, dated Sep. 25, 2018 (11 pgs).

* cited by examiner

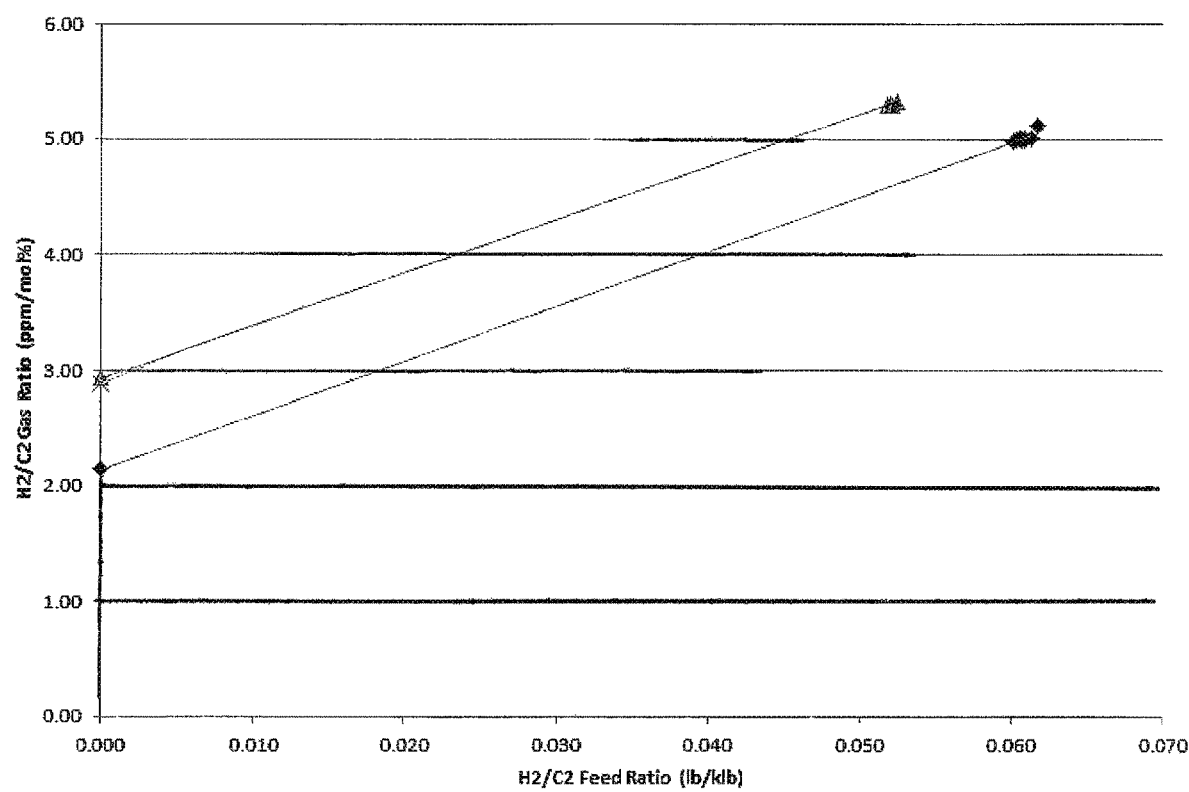

METHOD OF MAINTAINING A MELT FLOW INDEX OF A POLYETHYLENE POLYMER PRODUCT

This application is a National Stage Application under 35 U.S.C. § 371 of International Application Number PCT/US2018/036202, filed Jun. 6, 2018 and published as WO 2018/226787 A1 on Dec. 13, 2018, which claims the benefit to U.S. Provisional Application 62/516,813, filed Jun. 8, 2017, the entire contents of which are incorporated herein by reference in its entirety

FIELD

Embodiments of the present disclosure are directed towards polyethylene polymer product production, and more specifically towards a method of maintaining a melt flow index of a polyethylene polymer product during changes in reactor temperature.

BACKGROUND

Polyolefins such as polyethylene polymers are typically produced in a low pressure reactor, utilizing, for example, solution, slurry, or gas phase polymerization processes. Polymerization takes place in the presence of catalyst systems such as, for example, a Ziegler-Natta catalyst, a chromium based catalyst, a metallocene catalyst, or combinations thereof.

During their production, different process control models are used for real-time control of polyethylene polymer product production. These control models use polymer properties that are measurable explicitly or analytically in a relatively short period of time. The two most common properties that meet these requirements are density and melt flow index (MI), both of which are controlled during the polymerization reaction. Density is a relative measure on the degree of branching in the polymer product, where the ratio of ethylene to co-monomer is a manipulated to control density. The MI is a relative measure of the polymer product chain length, where the ratio of hydrogen to ethylene is a manipulated parameter to control the MI.

One of the main challenges in polyethylene polymer product production on the industrial scale is controlling the reaction temperature. Polyethylene polymerization reactions are very exothermic and it is important to keep the reactor temperature constant to ensure a high production rate of a polyethylene polymer product with the desired properties. Changes in reactor temperature, however, can happen either unexpectedly or during a grade transition for the polyethylene polymer product. Regardless of the reason, changes in reactor temperature can result in difficulties in maintaining the MI of the polyethylene polymer product at a target value due to changing reaction rates and hydrogen to ethylene gas ratios inside the reactor. As such, there is a need in the art for the ability to maintain control over the hydrogen gas ratios to ethylene gas ratios inside the reactor during changes in reactor temperatures so as to better maintain the MI of the polyethylene polymer production at a target value.

SUMMARY

The present disclosure provides for a method of maintaining a target value for a melt flow index (MI) of a polyethylene polymer product during changes in reactor temperature. Control over the reactor temperature is a primary technique used in adjusting the melt flow ratio ($I_{21}/I_2$) of a polyethylene polymer product. While making the temperature adjustments to either maintain the polymer grade (e.g., combination of density and MI for the polyethylene) or during a polymer grade transition, it is usually required to also adjust the hydrogen gas ($H_2$) concentration in the fluidized bed gas phase reactor to either maintain the target value of the MI of the polyethylene polymer or to move its value towards a new target value. Other changes in reactor temperature can occur due to upsets or due to temperature control issues that also need to be countered by adjusting the $H_2$ concentration in the fluidized bed gas phase reactor so as to maintain the target value of the MI of the polyethylene polymer.

It has been surprisingly discovered that while trying to maintain the target value of the MI for a polyethylene polymer product changes in reactor temperature resulted in changes in the hydrogen ($H_2$) to ethylene ($C_2$) gas ratio (H2:C2 gas ratio) that were in a direction opposite to the $H_2$ to ethylene ($C_2$) feed ratio (H2:C2 feed ratio). This is surprising as one skilled in the art typically assumes that both the H2:C2 feed ratio and the H2:C2 gas ratio move in the same direction based on an assumed linear trend of H2:C2 gas ratio versus H2:C2 feed ratio. But it has been discovered not to be the case for all polymerization systems synthesizing a polyethylene polymer product. Rather it has been surprisingly found that the H2:C2 gas ratio and the H2:C2 feed ratio move in opposite directions (in a mathematical sense), as discussed herein, when the reactor temperature changes during either an unexpected upset or during a grade transition for the polyethylene polymer product.

Having discovered how the changes in reactor temperature affect the relationship of the H2:C2 gas ratio to the H2:C2 feed ratio, the present disclosure provides for a method of maintaining a MI of a polyethylene polymer product during changes in reactor temperature. As noted herein, temperature changes (increase or decrease) in a fluidized bed gas phase reactor require adjustments in the H2 concentration in the fluidized bed gas phase reactor to maintain the target value of the MI of the polyethylene polymer. The present disclosure provides a method of maintaining a target value of the MI of the polyethylene polymer product being synthesized with a metallocene catalyst in a fluidized bed gas phase reactor. The method includes synthesizing the polyethylene polymer product at the target value of the MI with the metallocene catalyst in a fluidized bed gas phase reactor in which the fluidized bed gas phase reactor is at a first reactor temperature and receives feeds of hydrogen and ethylene at a hydrogen to ethylene feed ratio at a first ratio value. When a second reactor temperature is detected that is different from the first reactor temperature a change is made (e.g., by the operator and/or automated process control system) in the hydrogen feed to the fluidized bed gas phase reactor relative to the ethylene feed. The change in hydrogen feed relative to the ethylene feed changes the hydrogen to ethylene feed ratio from the first ratio value to a second ratio value. The change in hydrogen feed adjusts a hydrogen concentration in the fluidized bed gas phase reactor, where the second ratio value of the hydrogen to ethylene feed ratio is calibrated to maintain the MI value of the polyethylene polymer product at the target value.

Examples of when the second reactor temperature is detected that is different from the first reactor temperature can include detecting that the second reactor temperature is either less than or greater than the first reactor temperature. So, for example, upon detecting that the second reactor temperature is less than the first reactor temperature a change in the hydrogen feed relative to the ethylene feed is made so as to change the hydrogen to ethylene feed ratio. This change includes increasing the hydrogen feed relative to the ethylene feed so as to increase the hydrogen to ethylene feed ratio from the first ratio value to the second ratio value after detecting that the second reactor temperature is less than the first reactor temperature (as noted above and discussed herein more fully, one skilled in the art in this situation would have reduced, not increased, the hydrogen feed relative to the ethylene feed so as to reduce the hydrogen to ethylene feed ratio). The extent of the change in hydrogen feed relative to the ethylene feed so as to increase the hydrogen concentration in the fluidized bed gas phase reactor and is calibrated to maintain the melt flow index value of the polyethylene polymer product at the target value.

In an alternative embodiment, upon detecting that the second reactor temperature is greater than the first reactor temperature a change in the hydrogen feed relative to the ethylene feed is made so as to change the hydrogen to ethylene feed ratio. This change, however, includes decreasing the hydrogen feed relative to the ethylene feed so as to decrease the hydrogen to ethylene feed ratio from the first ratio value to the second ratio value after detecting that the second reactor temperature is greater than the first reactor temperature (as noted above and discussed herein more fully, one skilled in the art in this situation would have increased, not reduced, the hydrogen feed relative to the ethylene feed so as to increase the hydrogen to ethylene feed ratio). The extent of the change in hydrogen feed relative to the ethylene feed so as to decrease the hydrogen concentration in the fluidized bed gas phase reactor and is calibrated to maintain the melt flow index value of the polyethylene polymer product at the target value.

The present disclosure can also include a determining step for the direction of movement of the H2:C2 gas ratio in the fluidized bed gas phase reactor. This determining step can be used during or after detecting the second reactor temperature that is different from the first reactor temperature. The determining step allows for verification that the H2:C2 gas ratio and H2:C2 feed ratio are moving in opposite directions as the reactor temperature changes.

For the various embodiments, the metallocene catalyst is preferably a Hf based metallocene catalyst.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF DRAWINGS

The FIGURE a graph showing the effect of reactor temperature on H2/C2 gas and H2/C2 feed ratio according to the present disclosure.

DETAILED DESCRIPTION

The present disclosure provides for a method of maintaining a target value for a melt flow index (MI) of a polyethylene polymer product during changes in reactor temperature. It has been surprisingly found that while trying to maintain the target value of the MI for a polyethylene polymer product changes in reactor temperature resulted in changes in the hydrogen ($H_2$) to ethylene ($C_2$) gas ratio (H2:C2 gas ratio) that were in a direction opposite to the $H_2$ to ethylene ($C_2$) feed ratio (H2:C2 feed ratio). This is surprising as one skilled in the art typically assumes that both the H2:C2 feed ratio and the H2:C2 gas ratio move in the same direction based on an assumed linear trend of H2:C2 gas ratio versus H2:C2 feed ratio. But it has been discovered that this is not the case for all polymerization systems that produce a polyethylene polymer product. Rather it has been surprisingly found that the H2:C2 gas ratio and the H2:C2 feed ratio move in opposite directions, as discussed herein, when the reactor temperature changes during either an unexpected upset or during a grade transition for the polyethylene polymer product.

As used herein, density is measured by the gradient technique according to ASTM D 1505.

As used herein, melt flow index (MI) is measured according to ASTM-D-1138-E (190° C., 2.16 kg weight).

As used herein, "H2:C2 feed ratio" is the molar feed ratio of hydrogen to ethylene present in a feed stream entering the fluidized bed gas phase reactor.

As used herein, "H2:C2 gas ratio" is the molar feed ratio of hydrogen to ethylene present in the fluidized bed gas phase reactor.

As used herein, "maintaining" a target value of a MI of a polyethylene polymer product means that the MI is controlled to within 20% of the target value, or to within 10% of the target value, or to within 5% of the target value, or to within 2% of the target value.

The term "polyethylene polymer product" refers to a polymer having at least 50 wt. % ethylene-derived units. In various embodiments, the polyethylene polymer product can have at least 70 wt. % ethylene-derived units, at least 80 wt. % ethylene-derived units, at least 90 wt. % ethylene-derived units, or at least 95 wt. % ethylene-derived units. The polyethylene polymer products described herein are generally copolymer, but may also include terpolymers, having one or more other monomeric units. As described herein, a polyethylene polymer product can include, for example, at least one or more other olefins or co-monomers. Suitable co-monomers can contain 3 to 16 carbon atoms, from 3 to 12 carbon atoms, from 4 to 10 carbon atoms, and from 4 to 8 carbon atoms. Examples of co-monomers include, but are not limited to, propylene, 1-butene, 1-pentene, 1-hexene, 1-heptene, 1-octene, 4-methylpent-1-ene, 1-decene, 1-dodecene, 1-hexadecene, and the like.

As appreciated by one skilled in the art, control over the temperature of the fluidized bed gas phase reactor is a primary technique used in adjusting the melt flow ratio (MFR, $I_{21}/I_2$) of a polyethylene polymer. While making the temperature adjustments for various reasons to either maintain the polymer grade (e.g., combination of density and MI for the polyethylene) or during a polymer grade transition, it is usually required to also adjust the hydrogen gas ($H_2$) concentration in the fluidized bed gas phase reactor to either maintain the target value of the MI of the polyethylene polymer or to move its value towards a new target value. Other changes in temperature can occur due to upsets or due to temperature control issues that also need to be countered by adjusting the $H_2$ concentration in the fluidized bed gas phase reactor.

The present disclosure discusses the effect of the temperature of the fluidized bed gas phase reactor on H2:C2 feed ratio and H2:C2 gas ratio. The results show that for a given system the H2:C2 gas ratio and H2:C2 feed ratio move in opposite directions as the reactor temperature changes, as discussed herein. Using the present disclosure, it is possible to control the H2:C2 feed ratio and H2:C2 gas ratio during reactor temperature adjustments, upsets or grade transitions to prevent producing polyethylene polymer products that are "off-grade." The present disclosure may be used in implementing a control strategy to reduce producing off-grade polyethylene polymer product during transitions or upsets, where during a temperature transition the H2:C2 feed ratio can be adjusted in a direction opposite to the H2:C2 gas ratio detected in the fluidized bed gas phase reactor so as to maintain the polyethylene polymer product at the target value of the MI.

Specifically, the present disclosure provides for a method of maintaining a target value of a MI of a polyethylene polymer product being synthesized with a metallocene catalyst in a fluidized bed gas phase reactor. Each of the metallocene catalyst and the fluidized bed gas phase reactor are discussed herein. The method includes synthesizing the polyethylene polymer product at the target value of the MI with the metallocene catalyst in the fluidized bed gas phase reactor (e.g., at a steady state) in which the fluidized bed gas phase reactor is at a first reactor temperature and receives feeds of hydrogen and ethylene at a H2:C2 feed ratio at a first ratio value. When a second reactor temperature is detected that is different from the first reactor temperature there is a change in the hydrogen feed relative to the ethylene feed. Changing the hydrogen feed relative to the ethylene feed changes the H2:C2 feed ratio from the first ratio value to a second ratio value. Upon detecting the second reactor temperature the change in hydrogen feed adjusts a hydrogen concentration in the fluidized bed gas phase reactor, where the second ratio value of the H2:C2 feed ratio is calibrated to maintain the MI value of the polyethylene polymer product at the target value.

Examples of when the second reactor temperature is detected that is different from the first reactor temperature can include detecting that the second reactor temperature is either less than or greater than the first reactor temperature. Detecting that the second reactor temperature is less than the first reactor temperature causes the change in the hydrogen feed relative to the ethylene feed so as to change the H2:C2 feed ratio. This change includes increasing the hydrogen feed relative to the ethylene feed so as to increase the H2:C2 feed ratio from the first ratio value to the second ratio value after detecting that the second reactor temperature is less than the first reactor temperature. Such a change is calibrated to increase the hydrogen concentration in the fluidized bed gas phase reactor to maintain the melt flow index value of the polyethylene polymer product at the target value.

Detecting that the second reactor temperature is greater than the first reactor temperature can also cause the change in the hydrogen feed relative to the ethylene feed so as to change the H2:C2 feed ratio. This change includes decreasing the hydrogen feed relative to the ethylene feed so as to decrease the hydrogen to ethylene feed ratio from the first ratio value to the second ratio value after detecting that the second reactor temperature is greater than the first reactor temperature. Such a change is calibrated to decreases the hydrogen concentration in the fluidized bed gas phase reactor to maintain the melt flow index value of the polyethylene polymer product at the target value.

As noted, the present disclosure can also include a determining step for the direction of movement of the H2:C2 gas ratio in the fluidized bed gas phase reactor. This determining step can be used during or after detecting the second reactor temperature that is different from the first reactor temperature. The determining step allows for verification that the H2:C2 gas ratio and H2:C2 feed ratio are moving in opposite directions as the reactor temperature changes.

As discussed herein, the present disclosure is directed to a method of maintaining a target value of the MI of a polyethylene polymer product during changes in temperature in the fluidized bed gas phase reactor. The data seen in the Examples section herein suggest that as the temperature in the fluidized bed gas phase reactor is, for example, reduced the metallocene catalyst requires more hydrogen consumption to maintain the MI of the polyethylene polymer product and so requires a higher H2:C2 feed ratio. As a result, the H2:C2 gas ratio inside the fluidized bed gas phase reactor actually decreases as the temperature is reduced. In this situation, the lower H2:C2 gas ratio may be related to a reduction in H2 generation inside the fluidized bed gas phase reactor at the lower temperature.

Similarly, as the temperature in the fluidized bed gas phase reactor increases the metallocene catalyst requires less hydrogen consumption to maintain the target value of the MI of the polyethylene polymer product and so requires a lower H2:C2 feed ratio. As a result, the H2:C2 gas ratio inside the fluidized bed gas phase reactor actually increases as the temperature increases. In this situation, the higher H2:C2 gas ratio may be related to an increase in H2 generation inside the fluidized bed gas phase reactor at the higher temperature.

As noted herein, this opposite direction of the H2:C2 gas ratio versus the H2:C2 feed ratio as the temperature changes can cause confusion or incorrect moves during temperature changes during grade transitions or reactor temperature upsets. This is because one skilled in the art understands that a higher reactor temperature can cause a need for more $H_2$, not less, due to the observation that the H2:C2 gas ratio increases. Making this more confusing is that process control models for maintaining the MI show the relationship between the H2:C2 gas ratio and the temperature having a negative slope. So as the temperature increases the known control models indicate that the H2:C2 gas ratio needs to be higher at the higher temperature to maintain the values of the MI. But, repeating the learning discussed herein shows that the H2:C2 feed ratio actually goes the other way and shows that less H2 is needed at higher temperature to maintain the target value of the MI for the polyethylene polymer product. Similarly, more H2 is needed at lower temperature to maintain the target value of the MI for the polyethylene polymer product.

The metallocene catalyst may comprise any desirable metallocene catalyst composition known in the art useful in polymerizing olefins such as, but not limited to, Group 4 metallocenes (preferably, hafnocenes and zirconocenes). As used herein, the International Union of Pure and Applied Chemistry (IUPAC) notation (3 Oct. 2005) (www.iupac.org/reports/periodictable/) of the periodic table will be referenced unless otherwise specified.

The "hafnocene" may be a metallocene catalyst component comprising mono-, bis- or tris-cyclopentadienyl-type complexes of hafnium. In an embodiment, the cyclopentadienyl-type ligand comprises cyclopentadienyl or ligands isolobal to cyclopentadienyl and substituted versions thereof. Representative examples, but not exclusive, of ligands isolobal to cyclopentadienyl include cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H$_4$Ind") and substituted versions thereof. In one embodiment, the hafnocene is an unbridged bis-cyclopentadienyl hafnocene and substituted versions thereof. In another embodiment, the hafnocene excludes unsubstituted bridged and unbridged bis-cyclopentadienyl hafnocenes, and unsubstituted bridged and unbridged bis-indenyl hafnocenes, "unsubstituted" meaning that there are only hydride groups bound to the rings and no other group.

Preferably, the hafnocene useful in the present invention can be represented by Formula (1) (where "Hf" is hafnium):

$$Cp_n HfX_q \qquad (1)$$

wherein n is 1 or 2, q is 1, 2 or 3, each Cp is independently a cyclopentadienyl ligand or a ligand isolobal to cyclopentadienyl or a substituted version thereof bound to the hafnium; and X is selected from the group consisting of hydride, halides, $C_1$ to $C_{10}$ alkyls and $C_2$ to $C_{12}$ alkenyls; and wherein when n is 2, each Cp may be bound to one another through a bridging group A selected from the group consisting of $C_1$ to $C_5$ alkylenes, oxygen, alkylamine, silylhydrocarbons, and siloxyl-hydrocarbons. An example of $C_1$ to $C_5$ alkylenes include ethylene (—CH$_2$CH$_2$—) bridge groups; an example of an alkylamine bridging group includes methylamide (—(CH$_3$)N—); an example of a silyl-hydrocarbon bridging group includes dimethylsilyl (—(CH$_3$)$_2$Si—); and an example of a siloxyl-hydrocarbon bridging group includes (—O—(CH$_3$)$_2$Si—O—). In an embodiment of the hafnocene represented in Formula (1), n is 2 and q is 1 or 2.

As used herein, the term "substituted" means that the referenced group possesses at least one moiety in place of one or more hydrogens in any position, the moieties selected from such groups as halogen radicals (e.g., F, Cl, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbamoyl radicals, alkyl- and dialkyl-carbamoyl radicals, acyloxy radicals, acylamino radicals, arylamino radicals, and combinations thereof.

In another class of embodiments, the hafnocene useful in the present invention can be represented by Formula (2):

$$(CpR_5)_2 HfX_2 \qquad (2)$$

wherein each Cp is a cyclopentadienyl ligand and each is bound to the hafnium; each R is independently selected from hydrides and $C_1$ to $C_{10}$ alkyls, most preferably hydrides and $C_1$ to $C_5$ alkyls; and X is selected from the group consisting of hydride, halide, $C_1$ to $C_{10}$ alkyls and C2 to $C_{12}$ alkenyls, and more preferably X is selected from the group consisting of halides, C2 to C6 alkylenes and $C_1$ to C6 alkyls, and most preferably X is selected from the group consisting of chloride, fluoride, $C_1$ to $C_5$ alkyls and $C_2$ to $C_6$ alkylenes. In an embodiment, the hafnocene is represented by Formula (2) above, wherein at least one R group is an alkyl as defined above, preferably a $C_1$ to $C_5$ alkyl, and the others are hydrides. In another embodiment, each Cp is independently substituted with from one two three groups selected from the group consisting of methyl, ethyl, propyl, butyl, and isomers thereof.

In certain embodiments, the polymerization process may be carried out such that the metallocene catalyst is heterogeneous and comprises at least one support material. The support material may be any material known in the art for supporting metallocene catalyst compositions, such as an inorganic oxide, preferably silica, alumina, silica-alumina, magnesium chloride, graphite, magnesite, titania, zirconia, and montmorillonite, any of which can be chemically/physically modified such as by fluoridation processes, calcining, or other processes known in the art.

In an embodiment, the support material may be a silica material having an average particle size as determined by Malvern analysis of from 0.1 to 100 μm, most preferably 10 to 50 μm.

In a class of embodiments, the metallocene catalyst may comprise at least one activator. Such activators are well known in the art and include but are not limited to Lewis acids such as cyclic or oligomeric poly(hydrocarbylaluminum oxides and so called non-coordinating activators ("NCA"). The at least one activator may also comprise an alumoxane (e.g., methylalumoxane "MAO") and modified alumoxane (e.g., "MMAO" or "TIBAO"). The alumoxane may be co-supported on the support material, optionally, in a molar ratio of aluminum to hafnium (Al:Hf) ranging from 50:1 to 200:1, or 80:1 to 120:1. The activators are widely used and known in the art and may be suitable to activate metallocene catalysts for polyethylene polymer product polymerization. Preferably, the metallocene catalyst is a Hf based metallocene catalyst produced on a commercial scale by Univation Technologies under the trade name XCAT™ VP-100.

The "polymerization reactor" may be any type of fluidized bed gas phase reactor known in the art that is useful in polyolefins. An example of such fluidized bed gas phase reactor include a continuous fluidized bed gas phase reactor. Such reactors, for example, are generally capable of being operated at an overall pressure of less than 10,000 kPa, less than 8,000 kPa, less than 6,000 kPa, less than 4,000 kPa, and less than 3,000 kPa.

The fluidized bed gas phase reactor can be a "continuous" reactor, meaning that monomers and catalyst composition are continually or regularly fed to the fluidized bed gas phase reactor while the polyethylene polymer product is continually or regularly extracted from the reactor. The fluidized bed gas phase reactor includes a feed stream or "cycle gas" comprising the ethylene and a co-monomer, for example, hexene, butene, 1-octene, and/or mixtures thereof, both of which are flowed continuously through the polymerization reactor by any suitable means. Such reactors are well known in the art and described in more detail in U.S. Pat. Nos. 5,352,749, 5,462,999, and WO 03/044061. The amount of co-monomer can be expressed as a molar ratio relative to the amount of ethylene in the reactor. Preferably, the feed stream or "cycle gas" is provided to assist the reactor in maintaining a continuous flow of ethylene and co-monomer.

In embodiments utilizing the fluidized bed gas phase reactor, a monomer stream is passed to a polymerization section. As an illustration of the polymerization section, there can be included a reactor in fluid communication with one or more discharge tanks, surge tanks, purge tanks, and recycle compressors. In one or more embodiments, the reactor includes a reaction zone in fluid communication with a velocity reduction zone. The reaction zone includes a bed of growing polymer particles, formed polymer particles and catalyst composition particles fluidized by the continuous flow of polymerizable and modifying gaseous components in the form of make-up feed and recycle fluid through the reaction zone. Preferably, the make-up feed includes polymerizable monomer, most preferably ethylene and at least one other alpha-olefin, and may also include "condensing agents" as is known in the art and disclosed in, for example, U.S. Pat. Nos. 4,543,399, 5,405,922, and 5,462,999.

The fluidized bed has the general appearance of a dense mass of individually moving polyethylene particles created by the percolation of gas through the bed. The pressure drop through the bed may be equal to or slightly greater than the weight of the bed divided by the cross-sectional area. It is thus dependent on the geometry of the reactor. To maintain a viable fluidized bed in the reaction zone, the superficial gas velocity through the bed must exceed the minimum flow required for fluidization. The superficial gas velocity may be at least two times the minimum flow velocity.

In general, the height to diameter ratio of the reaction zone may vary in the range of about 2:1 to about 5:1. The range, of course, can vary to larger or smaller ratios and depends upon the desired production capacity. The cross-sectional area of the velocity reduction zone is typically within the range of about 2 to about 3 multiplied by the cross-sectional area of the reaction zone.

The velocity reduction zone has a larger inner diameter than the reaction zone, and can be conically tapered in shape. As the name suggests, the velocity reduction zone slows the velocity of the gas due to the increased cross sectional area. This reduction in gas velocity drops the entrained particles into the bed, reducing the quantity of entrained particles that flow from the reactor. That gas exiting the overhead of the reactor is the recycle gas stream.

The recycle gas stream is compressed in a compressor and then passed through a heat exchange zone where heat is removed before it is returned to the bed. The heat exchange zone is typically a heat exchanger which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle gas stream is returned to the reactor through a recycle inlet line. The cooled recycle gas stream absorbs the heat of reaction generated by the polymerization reaction.

Typically, the recycle gas stream is returned to the reactor and to the fluidized bed through a gas distributor plate. A gas deflector is preferably installed at the inlet to the fluidized bed gas phase reactor to prevent contained polyethylene polymer particles from settling out and agglomerating into a solid mass and to prevent liquid accumulation at the bottom of the reactor as well to facilitate easy transitions between processes which contain liquid in the cycle gas stream and those which do not and vice versa. An illustrative deflector suitable for this purpose is described in, for example, U.S. Pat. Nos. 4,933,149 and 6,627,713.

The catalyst composition or system used in the fluidized bed is preferably stored for service in a reservoir under a blanket of a gas which is inert (or does not react during the polymerization process) to the stored material, such as nitrogen or argon. The catalyst composition may be added to the fluidized bed gas phase reactor at any point and by any suitable means, and is preferably added to the reaction system either directly into the fluidized bed or downstream of the last heat exchanger (the exchanger farthest downstream relative to the flow) in the recycle line, in which case the activator is fed into the bed or recycle line from a dispenser. The catalyst composition is injected into the bed at a point above distributor plate. Preferably, the catalyst composition is injected at a point in the bed where good mixing with polymer particles occurs. Injecting the catalyst composition at a point above the distribution plate provides satisfactory operation of a fluidized bed polymerization reactor.

The monomers can be introduced into the polymerization zone in various ways including direct injection through a nozzle into the bed or cycle gas line. The monomers can also be sprayed onto the top of the bed through a nozzle positioned above the bed, which may aid in eliminating some carryover of fines by the cycle gas stream.

Make-up fluid may be fed to the bed through a separate line to the reactor. The composition of the make-up stream is determined by a gas analyzer. The gas analyzer determines the composition of the recycle gas stream and the composition of the make-up stream is adjusted accordingly to maintain an essentially steady state gaseous composition within the reaction zone. The gas analyzer can be a conventional gas analyzer that determines the recycle gas stream composition to maintain the ratios of feed stream components. Such equipment is commercially available from a wide variety of sources. The gas analyzer is typically positioned to receive gas from a sampling point located between the velocity reduction zone and heat exchanger.

The production rate of the polyethylene polymer product may be conveniently controlled by adjusting the rate of metallocene catalyst composition injection, activator injection, or both. Since any change in the rate of catalyst composition injection will change the reaction rate and thus the rate at which heat is generated in the bed, the temperature of the recycle gas stream entering the reactor is adjusted to accommodate any change in the rate of heat generation. This ensures the maintenance of an essentially constant temperature in the bed. Complete instrumentation of both the fluidized bed and the recycle gas stream cooling system is, of course, useful to detect any temperature change in the bed so as to enable either the operator or a conventional automatic control system to make a suitable adjustment in the temperature of the recycle gas stream.

Under a given set of operating conditions, the fluidized bed is maintained at essentially a constant height by withdrawing a portion of the bed as product at the rate of formation of the polyethylene polymer product. Since the rate of heat generation is directly related to the rate of product formation, a measurement of the temperature rise of the fluid across the reactor (the difference between inlet fluid temperature and exit fluid temperature) is indicative of the rate of particular polymer formation at a constant fluid velocity if no or negligible vaporizable liquid is present in the inlet fluid.

On discharge of polyethylene polymer product from reactor, it is desirable and preferable to separate fluid from the product and to return the fluid to the recycle line. There are numerous ways known to the art to accomplish this separation. Product discharge systems which may be alternatively employed are disclosed in U.S. Pat. No. 4,621,952. Such a system typically employs at least one (parallel) pair of tanks comprising a settling tank and a transfer tank arranged in series and having the separated gas phase returned from the top of the settling tank to a point in the reactor near the top of the fluidized bed.

In order to maintain an adequate reactor operability and catalyst productivity, it is preferable that the reactor temperature of the fluidized bed in the fluidized bed gas-phase reactor embodiment herein ranges from 70° C. or 75° C. or 80° C. to 90° C. or 95° C. or 100° C. or 110° C., wherein a desirable temperature range comprises any upper temperature limit combined with any lower temperature limit described herein. In addition to using the reactor temperature as a means to maintain reactor operability and catalyst productivity, the present invention provides for a method to use the reactor temperature, among other variables, to alter the composition distribution of the polyethylene polymer product.

As discussed herein, the H2:C2 feed ratio and the H2:C2 gas ratio are used in the fluidized bed gas phase reactor to control the MI of the polyethylene polymer product. Exemplary ranges of MI (grams/10 minutes, as measured according to ASTM-D-1138-E 190° C./2.16 kg) of the polyethylene polymer product include 0.1 to 4 (e.g., for film), 5 to 50 or 100 (e.g., for molding such as rotational and/or injection molding). In some of the examples, the MI may range from 0.1 to 5.0 dg/min, 0.5 to 1.0 dg/min, and other ranges. The density of the polyethylene polymer product may range from 0.910 to 0.975 g/cm$^3$, from 0.910 to 0.965 g/cm$^3$ or from 0.910 to 0.960 g/cm$^3$ as measured by ASTM D 792.

The amount of hydrogen used in the polymerization process can be an amount necessary to achieve the desired MI of the polyethylene polymer product. The first ratio value and the second ratio value of the H2:C2 feed ratio can be selected from values greater than 0.0001:1, greater than 0.0005:1, or greater than 0.001:1. Further, the H2:C2 feed ratio can be less than 10:1, less than 5:1, less than 3:1, and less than 0.10:1. A desirable range for the first ratio value and the second ratio value of the H2:C2 feed ratio can include any combination of any upper mole ratio limit with any lower H2:C2 feed ratio limit described herein. Further, the H2:C2 feed ratio can be 0.00001:1 to 2:1, 0.005:1 to 1.5:1, or 0.0001:1 to 1:1.

Examples

Some embodiments of the disclosure will now be described in the following Examples. All parts, proportions and percentages are by weight unless otherwise indicated.

Melt flow index (I$_2$) is measured in accordance with ASTM D-1238-E (at 190° C., 2.16 kg weight). Density is measured according to ASTM D-105. Melt flow ratio (MFR) is measured according to ASTM D1238.

A pilot plant campaign was conducted to evaluate the effects of reactor temperature on H2/C2 gas and H2/C2 feed ratio. The polymerization reactions were conducted in a fluidized bed gas phase reactor. The fluidized bed was made up of polymer granules. The gaseous feed streams of ethylene and hydrogen together with liquid comonomer were introduced below the reactor bed into the recycle gas line. Hexene was used as comonomer. The individual flow rates of ethylene, hydrogen and comonomer were controlled to maintain fixed composition targets. The concentrations of all the gases were measured by an on-line gas chromatograph to ensure relatively constant composition in the recycle gas stream.

The dry catalyst, a Hf based catalyst produced by Univation Technologies under the trade name XCAT™ VP-100, was injected directly into the fluidized bed using purified nitrogen as a carrier. The reacting bed of growing polymer particles was maintained in a fluidized state by the continuous flow of the make-up feed and recycle gas through the reaction zone of the fluidized bed gas phase reactor. The reactor was operated at a constant reaction temperature. The fluidized bed was maintained at a constant height by withdrawing a portion of the bed at a rate equal to the rate of formation of particulate product. The product was removed semi-continuously via a series of valves into a fixed volume chamber. This product was purged to remove entrained hydrocarbons and treated with a small steam of humidified nitrogen to deactivate any trace quantities of residual catalyst.

The results show (FIGURE) that the H2/C2 gas and H2/C2 feed ratio move in opposite directions when the reactor temperature is changed to maintain a constant MI. The FIGURE includes H2/C2 gas ratio and H2/C2 feed ratio data for a polyethylene polymer products that were produced using XCAT™ VP-100 Catalyst, a biscyclopentadienyl hafnium-based metallocene catalyst available from Univation Technologies, LLC.

As seen in the FIGURE, as the H2/C2 feed ratio decreases the plot does not go thru the zero points for the H2/C2 feed ratio and the H2/C2 gas ratio. This occurrence is believed to be the result of H2 generation by the XCAT™ VP-100 catalyst. The FIGURE also illustrates that the H2 generation rate is not constant and is dependent on the reactor temperature. The intercept points included in the FIGURE are based on the model regression and are not actual data points. The lines on the graph are included just to help see the different trends.

As illustrated in the FIGURE, comparing the data for the first polyethylene polymer product shown using the diamond data point symbol (reactor temperature of 80.0° C.; C6/C2 mol/mol ratio of 0.0168; MI of 0.99, melt flow ratio (MFR) of 27.0 and density of 0.9169) and the second polyethylene polymer product shown using the triangle data point symbol (reactor temperature of 88.6° C.; C6/C2 mol/mol ratio of 0.0153; MI of 0.99, MFR of 20.4 and density of 0.9162) shows that the higher reactor temperature to make the lower MFR grade operates at lower H2/C2 feed ratio (consumption) but at a higher H2/C2 gas ratio. This suggests that the higher reactor temperature generates more H2 as shown by the higher H2/C2 gas ratio to make the polyethylene polymer product with the MI at 0.99 at 88.6° C., but needs a lower H2/C2 feed ratio. This also suggests that raising the reactor temperature while maintaining a constant MI requires a lower H2/C2 consumption. This is the opposite direction for the H2/C2 gas ratio as it increases as the temperature increases.

All patents, test procedures, and other documents cited in this application are fully incorporated by reference to the extent such disclosure is not inconsistent with this application and for all jurisdictions in which such incorporation is permitted.

The invention claimed is:

1. A method of maintaining a target value of a melt flow index of a polyethylene polymer product being synthesized with a metallocene catalyst in a fluidized bed gas phase reactor, the method comprising:

producing the polyethylene polymer product at the target value of the melt flow index with a metallocene catalyst in a fluidized bed gas phase reactor at a steady state in which the fluidized bed gas phase reactor is at a first reactor temperature and receives feeds of hydrogen and ethylene at a hydrogen to ethylene feed ratio at a first ratio value;

detecting a second reactor temperature that is different from the first reactor temperature; and changing the hydrogen feed relative to the ethylene feed so as to change the hydrogen to ethylene feed ratio from the first ratio value to a second ratio value upon detecting the second reactor temperature to adjust a hydrogen concentration in the fluidized bed gas phase reactor, wherein the second ratio value of the hydrogen to ethylene feed ratio is calibrated to maintain the melt flow index value of the polyethylene polymer product at the target value.

2. The method of claim 1, wherein detecting the second reactor temperature that is different from the first reactor temperature includes detecting that the second reactor temperature is less than the first reactor temperature; and wherein changing the hydrogen feed relative to the ethylene feed so as to change the hydrogen to ethylene feed ratio includes increasing the hydrogen feed relative to the ethylene feed so as to increase the hydrogen to ethylene feed ratio from the first ratio value to the second ratio value after detecting that the second reactor temperature is less than the first reactor temperature to increase the hydrogen concentration in the fluidized bed gas phase reactor and is calibrated to maintain the melt flow index value of the polyethylene polymer product at the target value.

3. The method of claim 1, wherein detecting the second reactor temperature that is different from the first reactor temperature includes detecting that the second reactor temperature is greater than the first reactor temperature; and wherein changing the hydrogen feed relative to the ethylene feed so as to change the hydrogen to ethylene feed ratio includes decreasing the hydrogen feed relative to the ethylene feed so as to decrease the hydrogen to ethylene feed ratio from the first ratio value to the second ratio value after detecting that the second reactor temperature is greater than the first reactor temperature to decrease the hydrogen concentration in the fluidized bed gas phase reactor and is calibrated to maintain the melt flow index value of the polyethylene polymer product at the target value.

4. The method of claim 1, wherein during or after detecting the second reactor temperature that is different from the first reactor temperature the method further includes determining a direction of movement of a hydrogen to ethylene gas ratio in the fluidized bed gas phase reactor.

5. The method of claim 1, wherein the metallocene catalyst is a Hf based metallocene catalyst.

* * * * *